(12) United States Patent
Aisa et al.

(10) Patent No.: US 8,386,202 B2
(45) Date of Patent: Feb. 26, 2013

(54) COMMUNICATION DEVICE FOR HOUSEHOLD ELECTRIC APPLIANCES AND MONITORING SYSTEM USING SAID DEVICE

(75) Inventors: Valerio Aisa, Fabriano (IT); Fabrizio Concettoni, Cupramontana (IT); Silvio Corrias, Moncalvo (IT)

(73) Assignee: Indesit Company S.p.A., Fabriano (IT)

( * ) Notice: Subject to any disclaimer, the term of this patent is extended or adjusted under 35 U.S.C. 154(b) by 190 days.

(21) Appl. No.: 12/865,189

(22) PCT Filed: Feb. 4, 2009

(86) PCT No.: PCT/IB2009/000209
§ 371 (c)(1),
(2), (4) Date: Jul. 29, 2010

(87) PCT Pub. No.: WO2009/098581
PCT Pub. Date: Aug. 13, 2009

(65) Prior Publication Data
US 2010/0332164 A1 Dec. 30, 2010

(30) Foreign Application Priority Data
Feb. 5, 2008 (IT) ................. TO2008A0092

(51) Int. Cl.
*G01R 23/00* (2006.01)
(52) U.S. Cl. ............ 702/72; 702/75; 702/76; 324/76.11
(58) Field of Classification Search ............. 702/72, 702/75, 76, 85, 106; 324/76.11, 76.39
See application file for complete search history.

(56) References Cited

U.S. PATENT DOCUMENTS

| | | | | |
|---|---|---|---|---|
| 4,150,432 A | * | 4/1979 | Sorden | 702/78 |
| 4,317,049 A | * | 2/1982 | Schweppe | 307/39 |
| 6,338,009 B1 | * | 1/2002 | Sato et al. | 700/286 |
| 6,868,292 B2 | * | 3/2005 | Ficco et al. | 700/19 |
| 2001/0048030 A1 | | 12/2001 | Sharood et al. | |

FOREIGN PATENT DOCUMENTS

| | | |
|---|---|---|
| EP | 1 806 821 A | 7/2007 |
| WO | WO-99/43068 | 8/1999 |
| WO | WO-02/21660 A | 3/2002 |
| WO | WO-02/21664 A1 | 3/2002 |

* cited by examiner

*Primary Examiner* — Sujoy Kundu
(74) *Attorney, Agent, or Firm* — Cesari and McKenna, LLP

(57) ABSTRACT

A communication device, for connecting one or more electrical appliances to a remote service centre, comprises a control unit (AMC), means (PLG) for connecting the device (HG) to an alternating voltage electric mains network (Vac) and means (SK) for supplying the alternating mains voltage (Vac) to a power supply line of an electric appliance. The device (HG) further comprises first communication means (CSA), prearranged for receiving information possibly generated by the electric appliance and transmitted through the power supply line thereof, second communication means (ZB), prearranged for establishing a connection with a local area network (HN1) and third communication means (GGM), prearranged for establishing a connection with a further communication network, different from the local network (HN1), to which the remote service center is connected. The control unit (AMC) is prearranged for acquiring by means of the first communication means (CSA), first information possibly generated by the electric appliance and transmitted through the power supply line thereof and/or second information regarding electric energy consumptions associated to the operation of is the electric appliance, acquiring, by means of the second communication means (ZB), third information possibly available on the local network (HN1), and transmitting to the remote center (RMC), by means of the third communication means (GGM), at least one of the first, second and third information.

30 Claims, 10 Drawing Sheets

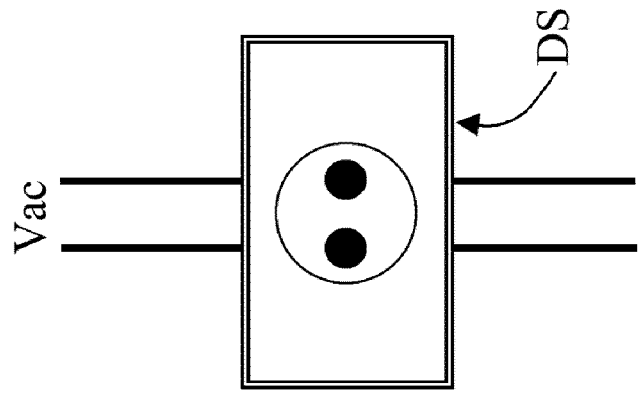
Fig. 5
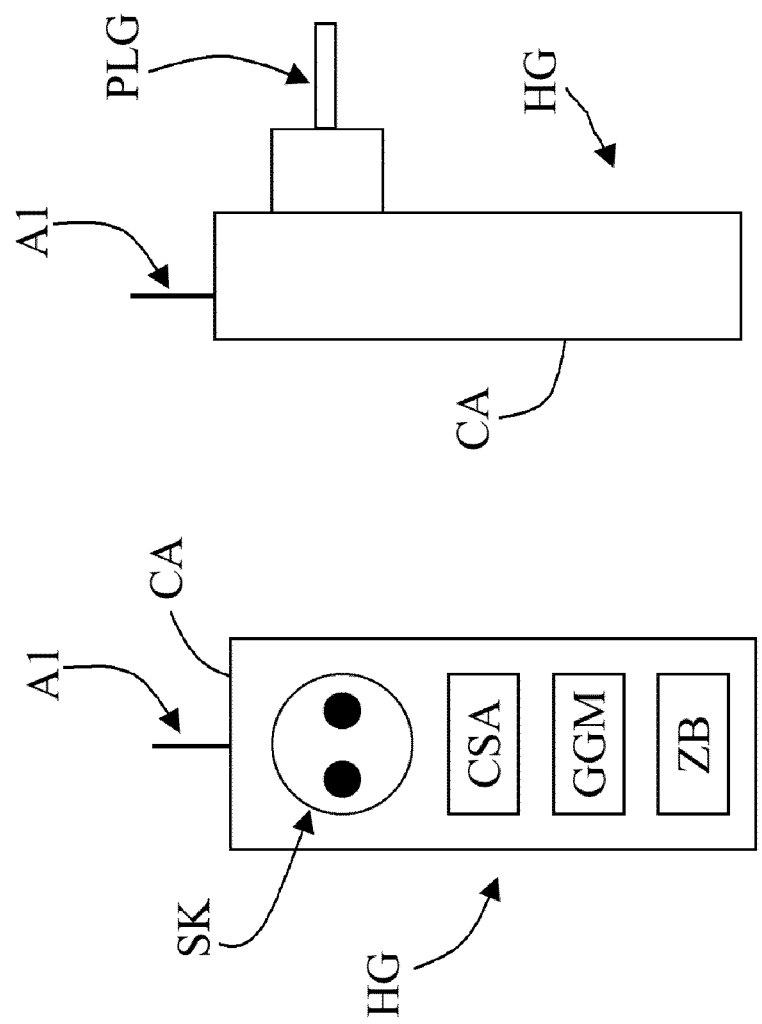
Fig. 4
Fig. 3

COMMUNICATION DEVICE FOR HOUSEHOLD ELECTRIC APPLIANCES AND MONITORING SYSTEM USING SAID DEVICE

BACKGROUND OF THE INVENTION

1. Field of the Invention

The present invention regards the subject of remote assistance and preventive servicing of electric appliances, particularly household electric appliances.

2. Prior Art

This subject was faced by the same Applicant in WO 99/43068. Such document describes a system for monitoring household appliances installed in the same household environment, whose control systems are prearranged for generating information of functional, diagnostic and statistical type, useful for technical servicing. The information generated by the household appliances is entered into a local area network, connected to which is a monitoring device, configured to gather the abovementioned information. The local network is represented by the same household is electric system, the communication system being of the power line communication type: for such purpose, the monitoring device and the household appliances of the system are provided with respective power line modems which allow connection to said local network. The monitoring device is prearranged for storing information gathered from the household network and subsequently showing them inside the household environment, for example by means of a display thereof. In a possible implementation, the monitoring device may be provided with a telephonic modem, such as a wireless telephonic modem according to the GSM European standard, to transmit information outside the household environment, towards a remote centre for technical assistance.

In this known embodiment, the abovementioned monitoring device meets the gateway functions, i.e. the functions of a device that allows interconnecting networks that use different architectures to each other, in particular with the aim of transferring the information gathered on the local electric mains network towards the outside of the household environment.

The solution described in this document has the drawback of exclusively taking into account electric appliances having inside a suitable communication device, being distinct from the digital control system of said appliances and communicating therewith by means of a suitable direct wired connection, incorporating the hardware and software means required for connecting to a local network based on PLC (Power Line Communication). This implies constraining the electric appliance to a determined communication technology that could make it obsolete shortly thereafter and, at the same time, it necessarily implies significant increase of costs for the appliance itself, hence seriously jeopardising its competitiveness in the market.

From WO 02/21664, of the same Applicant, methods, systems and apparatus are known, designed to allow an electric appliance to transmit a sequence of K bits (or a sequence of K digital or binary information), associated to an analogous sequence of consecutive K mains periods, through the variation of a quantity is representative of the electric energy consumed by the same appliance during each mains period of the abovementioned sequence of consecutive K mains periods. The term "mains periods" is used herein to indicate the time interval elapsed between two zero-crossings of the electric mains alternating voltage. The general teachings mentioned of the cited prior document, regarding the techniques employed to attain the abovementioned transmission, are deemed to be incorporated in the present description.

The variation of the value of a quantity representative of the electric energy consumed during the generic network period is performed, according to WO 02/21664, by the control system of the electric appliance through the variation of the value of the voltage applied to an electric load of the appliance itself and, consequently, of the current or power absorbed by the load at issue. The abovementioned variation is attained by means of a triac, which drives the load at issue of the electric appliance.

The information sent to the electric appliance in the described manner may be received by interposing a monitoring device between the power supply cable of the appliance and the related power socket. This monitoring device is capable of measuring, within each network period, the value of the abovementioned quantity that is representative of the electric energy consumed within the mains period, comparing such values with a suitable reference value and generating binary information depending on the result of such comparison.

A block diagram of the monitoring device according to WO 02/21664 is represented in FIG. 1, indicated with SA as a whole. As mentioned, the device SA essentially serves as a device for receiving digital information sent by the electric appliance associated thereto, indicated in the figure with HA, and is made up of the following three main functional blocks: a so-called power meter PM, a microcontroller M1 and a communication node N which controls the bidirectional communication with a local area network HN (Home Network). The information, sent according to WO 02/21664 by the electric appliance HA through the power supply cable thereof connected to the electric system Vac, are captured by the device PM, decoded by the microcontroller M1 and transmitted to the network HN through the communication node N.

The power meter PM is represented by a commercial measuring device, and specifically the CS5460 device of the US company Cirrus Logic, such device allowing to perform accurate measurements of electrical quantities that are representative of the energy consumed by the appliance HA within each period of the mains voltage.

The microcontroller M1 constantly dialogues with the power meter PM through a special fast communication line SL1 (for example a synchronous serial line such as a SPI, in the mentioned case of Cirrus Logic CS5460 device), with the aim of obtaining the abovementioned value of the quantity representative of the electric energy consumed during a generic mains period by the appliance HA. Subsequently, the same microcontroller M1 compares, with a determined reference value, the value previously obtained through the PM and, according to the result of the comparison, it generates a high or low logic value according to determined decoding criteria. In such manner, the microcontroller M1 performs, through the execution of suitable software routines, the decoding of the information sent by the electric appliance HA through the variation of the value of the quantity representative of the electric energy consumed by the appliance during each mains period and, after having suitably processed the information, it sends the latter, through a suitable communication line SL2, to the communication node N, which is connected to the local network HN.

Lastly, the communication node N is formed by two parts: a further microcontroller NC, which implements the communication protocol, and a transceiver PLM, which is the device that exchanges information with the local area network HN. Also in the case described by WO 02/21664 the local area network HN is represented by the same electric system of the household environment, given that the communication system is of the power line communication type.

The device SA of WO 02/21664 has the apparent advantage of performing two complementary functions at the same time: precise measurement (due to the high accuracy which is typical of the commercial "power meter" devices of the aforementioned type) of the electric energy consumptions associated to the appliance HA and the decoding of the digital information sent by the same appliance HA through the variation of the value of the quantity representative of the electric energy consumed during a generic mains period by the appliance. The device SA also has the advantage of performing the function of proxy with respect to the electric appliance HA, i.e. allowing the latter to dialogue, through the communication node N, with the local area network HN, without requiring the appliance HA be directly interfaced with said local network HN and control the related communication protocol: in such a manner, the cost associated to the connection of the appliance HA with the local network HN is totally charged on the device SA and thus no economical detriment is provided for such appliance HA.

SUMMARY OF THE INVENTION

In the monitoring device described in WO 02/21664, the transceiver PLM is made up of a power line communication modem (such as a transceiver PLT-22 of the US company Echelon), adapted to guarantee bidirectional communication towards the external environment through the LonTalk protocol (ANSI EIA-709). Such protocol is implemented in the microcontroller NC (such as an Echelon Neuron Chip device, manufactured by Toshiba or Cypress, or any other supplier). Therefore, also according to WO 02/21664, the electric appliance HA is capable of generating information, for example of the diagnostic type, and communicate it to the device SA, where it is stored in suitable memory means, to be made available to the person in charge of technical servicing regarding the appliance. For such purpose, the device SA may possibly communicate the abovementioned information on the local area network HN, represented by the home electric system, through its power line communication node N with.

However, in order to be able to send such information at remote level it is necessary that connected to the abovementioned local network HN be a device suitable for communicating with the external environment, typically designated by the term "gateway", which, in turn, is capable of dialoguing with a remote servicing centre. Said gateway may for example be made up of the device described in WO 99/43068 which, as mentioned, is provided with a respective power line communication node and with a telephone modem. However, such a gateway is not yet available in the market at costs accessible for the larger share of consumers.

The present invention mainly aims at providing a communication device, adapted to meet the Home Gateway functions and being of compact and inexpensive production, and which also has a more flexible use with respect to the known devices, in order to allow monitoring of one or more electrical appliances. This aim is attained by means of a communication device and by means of a system for monitoring electrical appliances having the characteristics indicated in claims 1-22.

In the present description, unless specified otherwise, the term "mains period $T_j$" is meant to indicate the time interval elapsed between two zero-crossings of the mains alternating voltage (hereinafter referred to as Vac) characterised by the same descent or ascent front (nevertheless without excluding, regarding practical implementation of the present invention, that the same mains period be delimited by the time interval that elapses between two zero-crossings, characterised by the same descent or ascent front, of the alternating voltage absorbed by an electric appliance).

Likewise, in the present description, and unless specified otherwise, the term "quantity $E_j$ representative of the electric energy consumed during a mains period $T_j$" is meant to indicate the maximum value, or the average value, or the effective value, or any other value, all derived from a suitable processing of a significant set of precise values, of the current or of the electric power absorbed during a generic mains period, or still, the value itself of the energy actually consumed within said mains period $T_j$.

In summary, according to the invention, a communication device is provided, which is configured to allow to interconnect one or more electrical appliances, particularly household electric appliances, to a remote service centre, particularly a centre offering remote and preventive servicing regarding said one or more electrical appliances. The communication device according to the invention comprises:

at least one control unit, first electric connection means, for connecting the communication device to an alternating voltage electric mains network, second electric connection means, for supplying the alternating voltage of said network to a to a power supply line or cable belonging to a first electric appliance, first communication means operatively connected to the control unit and is prearranged for receiving information possibly generated by said first electric appliance and transmitted by the latter by means of said power supply line. The first communication means comprise:

measuring means, connected between the first and the second connection means and prearranged for measuring at least one quantity $E_j$ representative of the electric energy absorbed from said electric network during a generic mains period $T_j$ by said first electric appliance, comparison means, for comparing the value of said quantity $E_j$ with at least one reference value, generator means, for generating a digital signal whose logic state during a considered period of the mains voltage is a function of the result of the comparison performed by the comparison means between the value of the quantity $E_{j-1}$, measured during the period $T_{j-1}$, of the mains voltage, i.e. the value of the quantity measured at the end of the mains period immediately preceding the considered period, with said at least one reference value.

The communication device further comprises second communication means operatively connected to the control unit and prearranged for establishing a connection with a local area network, and third communication means operatively connected to the control unit and prearranged for establishing a connection with a further communication network, different from said local network, suitable to communicate with the above-mentioned remote service centre.

The control unit of the device according to the invention is prearranged for acquiring, by means of the first communication means, first information possibly generated by said first electric appliance and transmitted by means of said power supply line or cable and/or second information generated by the measuring means and related to electric energy consumptions associated to the operation of said first electric appliance, acquiring, by means of the second communication means, third information possibly available on said local network, and transmitting to said remote centre, by means of the third communication means, at least one of the first, second and third information.

The means for dialoguing with the local network depend on the characteristics of the network itself, which might be, according to the invention, based on radio frequency or on PLC (Power Line Communication), or also on communication by means of electric cables. The means for dialoguing with the remote service centre are preferably of the wireless type, but also a normal telephone line can be used, exploiting for example an Internet connection already present in the environment in which the communication device object of the invention is installed.

A first important advantage of the invention is the possibility to make a low-cost communication device for creating a connection between a first electric appliance, supplied by means of the same communication device, and the remote centre that offers remote assistance and preventive servicing services regarding the abovementioned first electric appliance. The device according to the invention may be advantageously associated to the offer of extending the duration of the total guarantee of the considered electric appliance, represented for example by a household appliance. In such a manner, the electric appliance may send to the remote centre, day after day, information of statistical type regarding the use of the household appliance and, whenever required, also information of diagnostic type generated by the self-diagnosis system of the product in cases of malfunction or incipient failure. A second important advantage of the invention is the possibility to associate, to the same communication device which supplies the first electric appliance, also one or more further electrical appliances and/or other electrical devices connected to the same local area network to which the device object of the invention is connected. In such a manner, the same device may be exploited for connecting the further electrical appliances to the remote centre that offers remote assistance and preventive servicing services. A further advantage of the invention is the possibility to associate, to the same communication device that supplies the first electric appliance and dialogues with the possible further appliances or devices is connected to the abovementioned local network, possible sensor means present in the same household environment and also connected to the same local network.

Furthermore, due to the abovementioned characteristics, the communication device according to the invention is flexible to use, and it can be used advantageously in combination with electrical appliances capable of communicating only by means of the power supply cable thereof, in combination with electrical appliances capable of communicating only by means of a communication node (installed on board the same) of the local network, and in combination with electrical appliances not prearranged for communicating with the external environment.

Furthermore, the Applicant observed that the functional accuracy and reliability of the device SA according to WO 02/21664 may be improved by configuring the microcontroller M1 in such a manner that the latter acquires from the power meter PM, during each mains period, a significant set of samples of the quantity representative of the electric energy consumed by the electric appliance HA within said mains period, and calculates its derived value (such as the average value, or the effective value, or the maximum value, or any other quantity obtained by suitably combining the values of the abovementioned significant set of samples). The same microcontroller M1 compares the derived value thus calculated with the abovementioned reference value, and then generates the high logic level depending on the result of the comparison. However, according to this approach, the power meter—in order to be able to supply to the microcontroller M1 all the information required for decoding the digital information sent by the electric appliance HA—must constantly and quickly exchange information with the microcontroller itself. On the other hand, the microcontroller M1 must acquire, within each mains period, a sufficiently high number (i.e. such to guarantee the efficiency of the measurement) of sampled values of the quantity representative of the electric energy consumed by the appliance HA in that same mains period, and it must constantly execute a quite complex software algorithm to perform the correct decoding of the possible digital information associated to the abovementioned network period. Thus, the microcontroller must be provided with a high processing power, and this has an impact on the overall cost of the monitoring device.

According to a second aspect, the present invention has the aim of providing a solution capable of overcoming these drawbacks. This aim is attained by an integrated measuring circuit and by a device for communicating and/or monitoring electrical appliances having the characteristics as described herein.

In summary, the abovementioned integrated circuit comprises means for measuring at least one quantity $E_J$ representative of the electric energy absorbed from the electric mains, during a general mains period $T_J$, by an electric appliance. The circuit also integrates:

hardware means, i.e. made by means of logic circuits, to compare the value of the abovementioned quantity $E_J$ with at least one reference value, and hardware means for generating a digital signal whose logic state, during a considered period of the mains voltage, is a function of the result of the comparison performed by the comparison means between the value of the quantity $E_{J-1}$, measured during the period $T_{J-1}$ of the mains voltage (i.e. the value of the quantity measured at the end of the mains period immediately preceding the considered period), with the abovementioned at least one reference value.

In a possible embodiment, the reference value is single and the hardware means for generating the digital signal are configured to assign the latter the respective logic state according to the following logic:

if $E_{J-1} > E_R$ then $D_J = H$
if $E_{J-1} < E_R$ then $D_J = L$
if $E_{J-1} = E_R$ then $D_J = D_{J-1}$.

where H and L are two opposite binary logic levels, particularly H=1 and L=0, and $E_R$ is the single reference value.

In a preferred embodiment, two reference values are used and the means for generating the digital signal are configured to assign the latter the respective logic state according to the following logic:

if $E_{J-1} > E_H$ then $D_J = H$
if $E_{J-1} < E_L$ then $D_J = L$
if $E_L \leq E_{J-1} \leq E_H$ then $D_J = D_{J-1}$ where H and L are two opposite binary logic levels, particularly H=1 and L=0, $E_H$ is a greater reference value and $E_L$ is a lower reference value.

A first important advantage is the extreme simplification of the procedure for decoding the binary information sent by an electric appliance, during a determined mains period, through the variation of the value of a quantity representative of the electric energy consumed by the appliance during the same mains period. As a matter of fact, such decoding is performed through hardware means, obtained through standard logic circuits, by the same integrated measuring circuit, instead of being obtained through software means by a microcontroller which dialogues with an integrated circuit serving as an electrical quantities measuring device: this implies that the use of a high performance, hence costly, microcontroller is not required, given that all that is required is an inexpensive microcontroller, or exploiting residue resources of a microcontroller intended to perform another function, for example the microcontroller that controls the communication protocol of a determined local network.

A second important advantage, which is a direct consequence of the first one, is the possibility to directly interface the integrated measuring circuit of the invention with the microcontroller of a communication module, i.e., with the same microcontroller which controls the communication protocol towards a determined local network, given that the procedure for acquiring the information, decoded via hardware by the measuring device of the invention, compatible with the residual resources available on such microcontroller. This allows substantial saving due to the elimination of the microcontroller M1, provided for by the prior art described by WO 02/21664, the function of said microcontroller being totally performable—in that simplified by the decoding hardware performed by the measuring device according to the invention—by the same microcontroller that controls the communication protocol towards a determined local network.

A further advantage, directly deriving from the previous ones, is also the drastic reduction of the physical dimensions of the monitoring device which includes the integrated measuring circuit according to the invention, with respect to the one described in WO 02/21664, and this allows an easier and more efficient industrialisation thereof.

Therefore, according to a particularly advantageous embodiment, the measuring means, the comparison means and the generator means of the above-mentioned communication device are implemented in a hardware manner in one and the same integrated circuit of the ASIC type (Application-Specific Integrated Circuit), by means of logic circuits. In this manner, the said integrated circuit may provide, using hardware means, an efficient decoding procedure—based on the acquisition of several sampled values of the quantity representative of the electric energy consumed by the appliance HA in a mains period—which on the contrary, using the means known from WO 02/21664, should be made by means of sophisticated software algorithms controlled by the microcontroller M1. Thus, in this manner, an extreme simplification of the procedure for decoding information generated by the electric appliance supplied by means of the communication device can be obtained. Such solution further allows reducing the dimensions of the device, to the advantage of an easier and cheaper industrialisation.

BRIEF DESCRIPTION OF THE DRAWINGS

Further objects, characteristics and advantages of the present invention shall be apparent from the following description and from the attached figures, strictly provided for exemplifying and non-limiting purposes, wherein:

FIGS. 3 and 4 are schematic views, respectively a front view and a side view, of a possible physical embodiment of the device of FIG. 2;

FIG. 5 is a schematic front view of a generic power socket to which the device of FIGS. 3 and 4 may be connected;

DESCRIPTION OF THE PREFERRED EMBODIMENTS OF THE INVENTION

Figure 2:
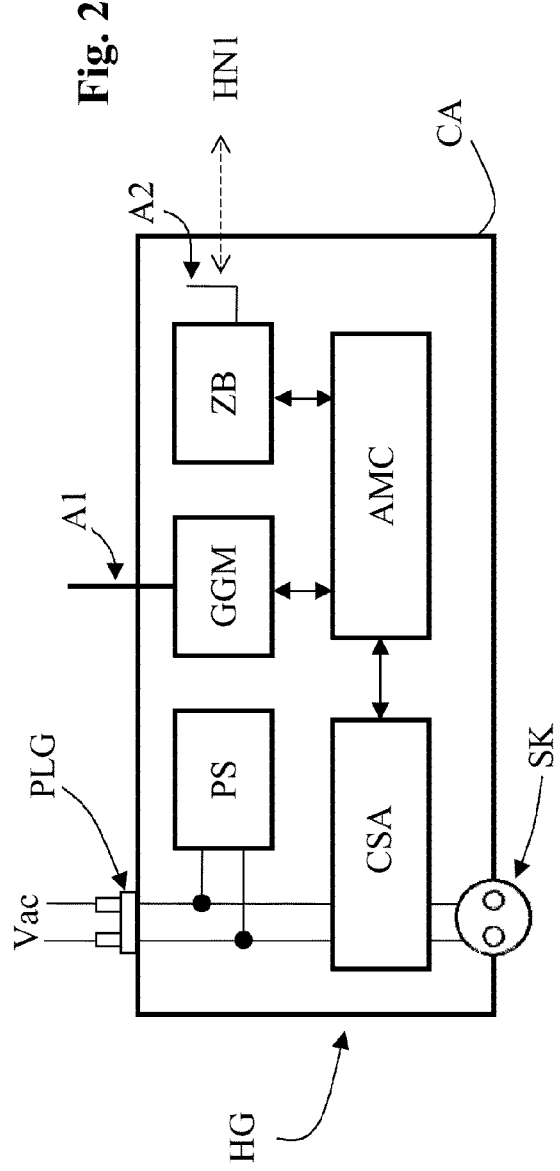
FIG. 2 is a block diagram of a communication device according to the invention.

FIG. 2 represents a simplified block diagram of a communication device according to the present invention, indicated with HG as a whole, having a casing CA, preferably made of plastic material. In the illustrated example, the device HG comprises five functional blocks, indicated with PS, CSA, AMC, GGM and ZB, where:

PS is an AC-DC feeder, known per se, which supplies low voltage direct current to the other elements of the device HG;

CSA is a solid state integrated circuit which, according to an independently inventive aspect, implements in compact form, for example by means of ASIC technology, the two blocks PM and M1 (see FIG. 1) provided according to WO 02/21664, therewith obtaining a first communication means of the device HG according to the invention;

ZB is a transceiver of the per se known type, which provides a second communication means for allowing the device HB to dialogue with a local network; in an embodiment of the invention, the transceiver ZB is interfaced with a radio frequency local network (HN1), through the antenna indicated with A1, for example a local network in compliance with the ZigBee specifications (standard IEEE-802.15.4), or WiFi, Bluetooth, Z-Wave or other wireless protocol of the standard or proprietary type; In another embodiment of the invention, the transceiver ZB is interfaced with a household electric network and communicates by means of any PLC communication technique (Power Line Communication) based on any protocol, for example LonTalk or Konnex or X-10 or Home-Plug or any other standard or proprietary protocol;

GGM is a modem, known per se and provided with its internal microcontroller, which provides third communication means for allowing the device HB to communicate with a remote service centre (indicated hereinafter with RMC), i.e. a centre spatially distant with respect to the environment or building in which the device HG is installed and offering various types of services, particularly remote assistance and preventive servicing regarding one or more electrical appliances associated to the device HG according to the invention; in a preferred but non-limiting embodiment of the invention, the modem GGM is a radio frequency modem with antenna A2 based on the GSM/GPRS European standard protocol; in other embodiments, the radio frequency modem GGM is based on any other protocol, alternative to the GSM/GPRS European protocol, already adopted or adoptable as a standard protocol for the national telecommunication service, by countries that do not use the GSM/GPRS standard;

AMC is a microcontroller dedicated to the "Home Gateway" application associated to the device HG according to the invention. The microcontroller AMC, also of a conception being known per se, provides the main control unit of the device HG and is configured to perform the role of mediator between the circuit CSA, on one hand, and transceiver ZB and the modem GGM, on the other hand, to control the communication protocol related to ZB and, in a preferred embodiment, to perform the role of supervisor and coordinator of the abovementioned local network.

As schematically represented also in FIGS. 3 and 4 (in which the blocks PS and AMC were omitted for clearer representation purposes), the casing CA of the device HG according to the invention is preferably provided with first electric connection means, such as for example a plug indicated with PLG, for the connection to an alternating voltage household electric mains network, indicated with Vac; the connection of the device HG to the network Vac may occur by means of a standard power socket, schematically represented in FIG. 5, where it is indicated with SD. The casing CA of the device HG is further provided with second electric connection means, represented for example by a power socket indicated with SK, for connecting the plug of a power supply cable of an electric appliance or a different power supply line of such an appliance. It is apparent that any other physical embodiment of the device HG, different from the one exemplified in FIGS. 3 and 4, falls within the scope of protection of the invention. As observable hereinafter, in the exemplified use, the power supply cable of the electric appliance may be connected to a power socket DS of the network Vac having the device HG interposed: in such manner, the measuring circuit CSA is connected in series between the abovementioned power supply cable and the power socket DS.

In a monitoring system according to the invention, the considered appliance is advantageously of the type capable of transmitting information according to the general principles indicated in WO 02/21664. In such manner, the information sent by the electric appliance through its power supply cable may be captured and decoded by the communication means implemented by the device CSA, also in this case according to the general communication principles provided by WO 02/21664: as already mentioned, in fact, the circuit CSA meets the function of measuring the value of a quantity representative of the electric energy consumed within each mains period, the comparison of such value with a suitable reference value and the generation of binary information depending on the result of such comparison.

For such purpose, the integrated circuit CSA is configured to be in communication with the microcontroller AMC and the latter is configured, according to known technique, to control the communication protocol towards the local network—indicated with HN1 in the figures—and the dialogue with the remote centre RMC, the two communications being attained by means of the devices ZB and GGM, respectively. The GSM/GPRS protocol may be directly managed by the modem GGM, through its internal microcontroller.

Figure 6:
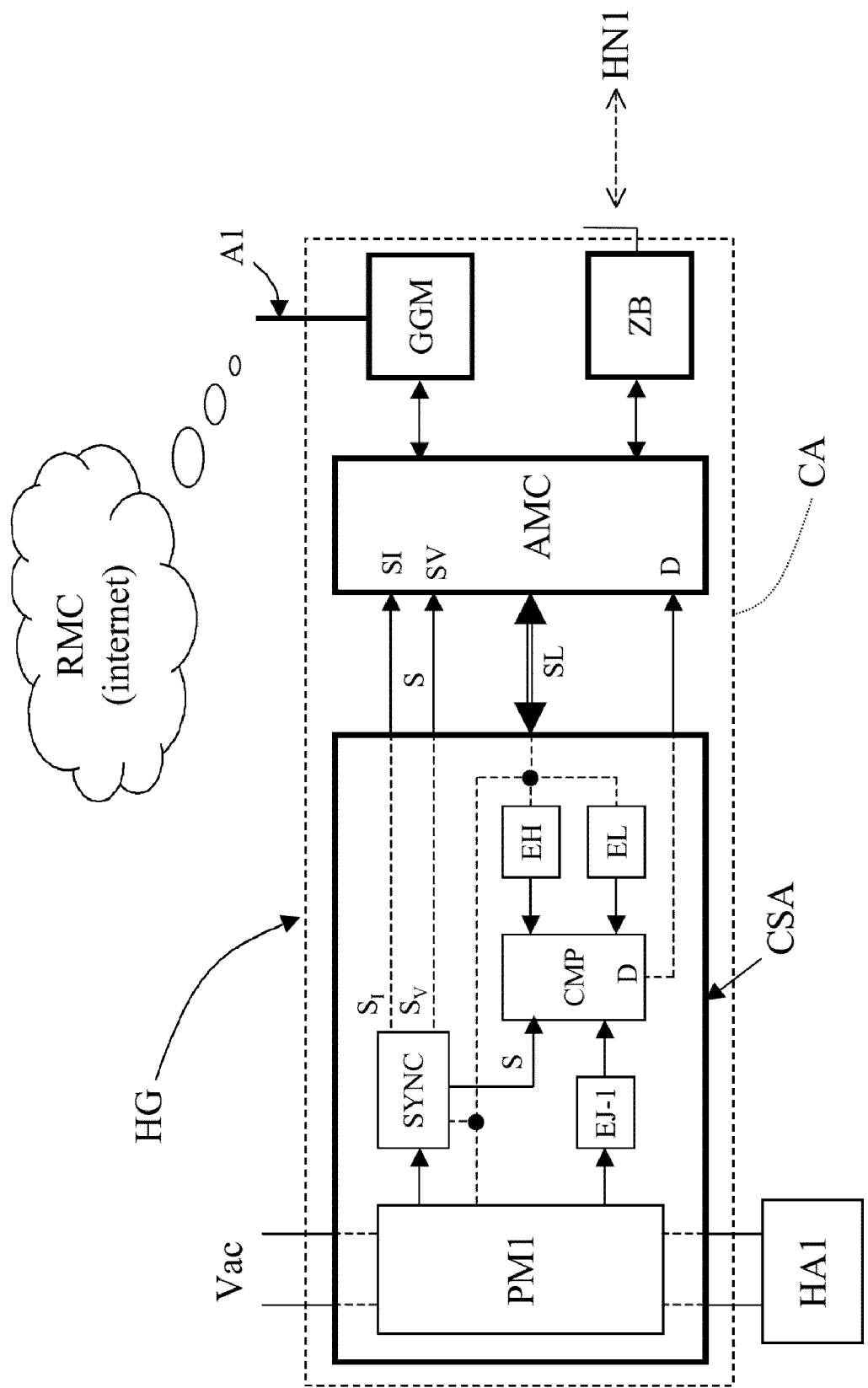
FIG. 6 is a block diagram of a particularly advantageous embodiment of the communication device of FIG. 2.

FIG. 6 illustrates a particularly advantageous embodiment of the device HG according to the invention, according to which the communication between the circuit CSA and the microcontroller AMC occurs through two complementary modes: the first mode is performed by means of a communication line, indicated with SL, of a conception known per se; the second communication mode is performed by means of two signals, indicated with D and S, generated by two digital outputs of the integrated circuit CSA and sent to two corresponding digital inputs of the microcontroller AMC. Through the first communication mode, of the bidirectional type, the microcontroller AMC, suitably programmed with techniques being known per se, may have access to the internal registers of the integrated circuit CSA and read the contents thereof (characterised for example by the results of the measurements of various electrical quantities) according to need, and may, further, dynamically modify the mode of operation of the circuit CSA operating on the configuration of the control registers (EH, EL, SYNC).

Through the second communication mode, of the unidirectional type, the microcontroller AMC provides for, by means techniques being also known per se, acquiring and processing the binary value sequences generated, period (mains) after period, by the digital output D of the circuit CSA, such acquisition being performed by AMC according to a synchronism signal S. It should be observed that, according to the invention, the second communication mode may guarantee the decoding functionality of the digital information sent, mains cycle after mains cycle, by the electric appliance HA connected thereto, and communicating such information to the microcontroller AMC through the output port D and S, even not taking into account the first communication mode, based on the bidirectional communication line SL; in such case, the control registers (EH, EL, SYNC) of CSA acquire fixed default values set during the step of initialization or start-up of the device.

The acquisition of the digital values acquired by the signal D occurs at the beginning of each new mains period and it is associated to the synchronism signal S produced by the integrated circuit CSA, said synchronism signal typically being generated at the zero-crossing of the mains alternating voltage Vac. In particular cases, the abovementioned synchronism signal may be generated at the zero-crossing of the alternating current (hereinafter referred to as $I_{HA}$) absorbed by the electric appliance HA1. In a currently preferred embodiment the microcontroller AMC acquires by default, period (mains) after period, the digital value of the signal D associated to the synchronism signal $S_V$, generated at the zero-crossing of the mains voltage Vac.

Figure 1:
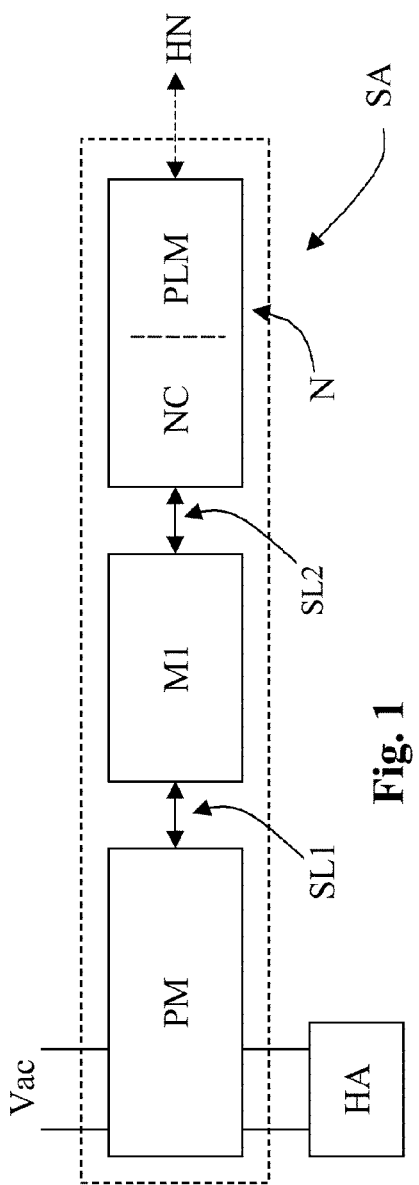
FIG. 1 is a block diagram of a monitoring device according WO 02/21664.

It is apparent that, in the particularly advantageous implementation of FIG. 6, the circuit CSA therein integrates the functions of the blocks PM and M1 of FIG. 1, attaining—by hardware means—an efficient decoding procedure also based on the acquisition of a plurality of sampled values of the quantity representative of the electric energy consumed by the appliance HA in a mains period. Thus, such hardware decoding procedure represents, according to the solution proposed herein, a more efficient and inexpensive solution with respect to the dynamic execution of sophisticated software logarithms which—as mentioned—using means provided for by WO 02/21664, should be performed by the microcontroller M1. Therefore, advantageously, the circuit CSA may be directly interfaced with the microcontroller AMC, i.e. the same microcontroller that controls the communication protocol towards the local network HN1 and which dialogues with the modem GGM prearranged for the wireless connection with a remote service centre RMC.

The block diagram of FIG. 6 illustrates the hardware mechanism through which the measuring circuit CSA attains the procedure of decoding the information sent by the electric appliance HA1 on its power supply cable, which is connected to the mains voltage Vac. In particular, represented are the following modules or functional blocks:

the measuring block indicated with PM1, prearranged for measuring at least one quantity $E_J$ representative of the electric energy absorbed by the mains Vac during a generic mains period $T_J$ by the appliance HA1; as explained beforehand, the quantity $E_J$ is represented by at least one among the maximum value, the average value, the effective value, any other value, all deriving from suitable processing of a significant set of precise values, of the electric current or power absorbed during a generic mains period, or still the value itself of the energy actually consumed within said mains period $T_J$;

the memory block or register indicated with EJ-1, containing the measured value of the quantity $E_{J-1}$ representative of the electric energy absorbed by the mains network Vac by the appliance HA1 during the mains period $T_{J-1}$, i.e. at the end of the main period immediately preceding the considered mains period;

the memory block or register EH, containing the greater reference value $E_H$ which, in a preferred implementation of the invention, must be compared with the measured value $E_{J-1}$ and is dynamically provided by the microcontroller MC by means of the bidirectional communication SL;

the memory block or register EL, containing the lower reference value $E_L$ which, in a preferred implementation of the invention, must be compared with the measured value $E_{J-1}$ and is provided dynamically by the microcontroller AMC through the same bidirectional communication SL;

the synchronism block SYNC, prearranged for generating synchronism signals associated to the zero-crossings of the mains voltage Vac (signal $S_V$) or of the current absorbed $I_{HA}$ by the electric appliance HA1 (signal $S_I$) or of both such electrical quantities, said zero-crossings being characterised by the same descent or ascent front and such to delimit a time interval coinciding with the mains period;

the digital comparison block CMP which, using one of the synchronism signals $S_V$ and $S_I$—which are generated by the block SYNC and which are respectively associated to the voltage Vac and to the current $I_{HA}$—performs the comparison of $E_{J-1}$ with $E_H$ and $E_L$ and generates a digital signal $D_J$, whose H (high) or L (low) logic level depends on the result of the abovementioned comparison based on criteria indicated hereinafter.

The practical way of embodying the abovementioned hardware blocks regarding the circuits CSA is not part of the objects of the present invention, and therefore they shall not be described herein. Such blocks, and thus the manufacturing of the respective logic circuits, are known per se singularly to a man skilled in the art.

Figure 7:
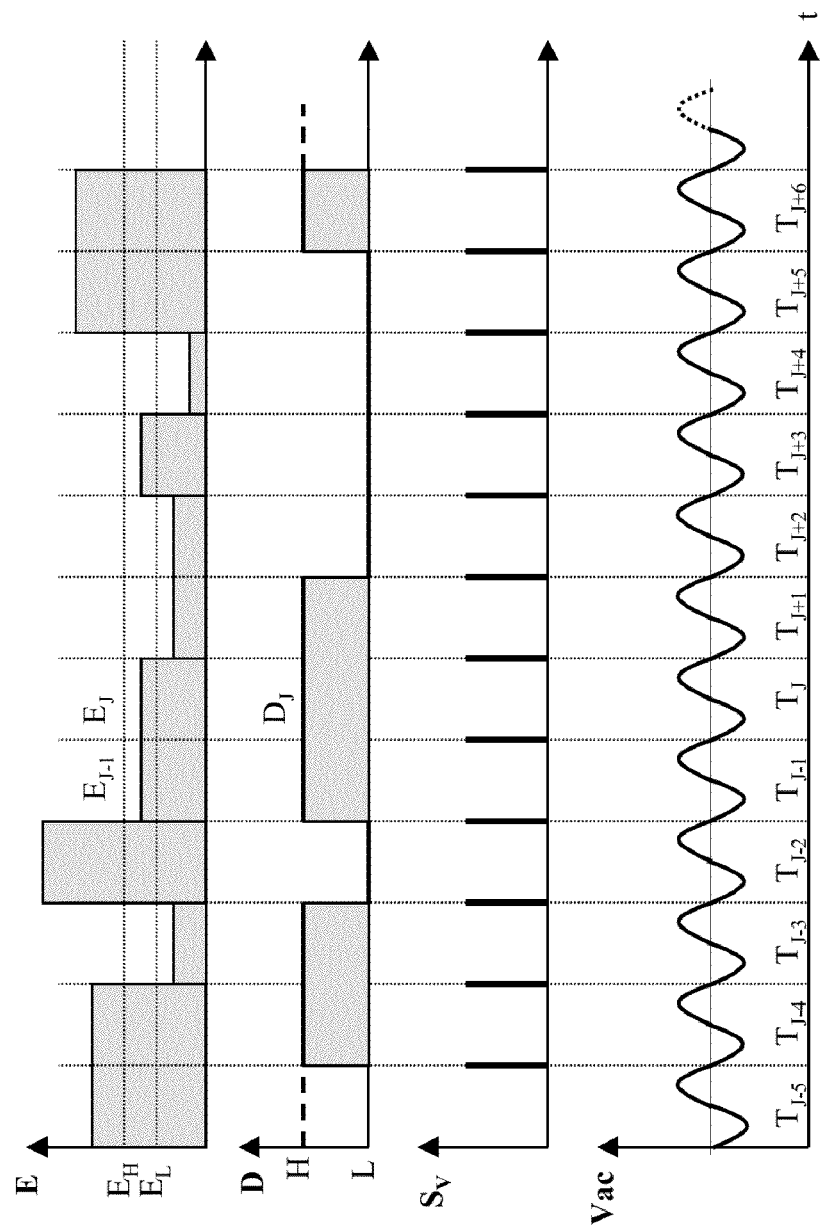
FIGS. 7 and 8 describe two possible methods for receiving, by the device of FIG. 6, digital information sent by a respective electric appliance.
Figure 8:
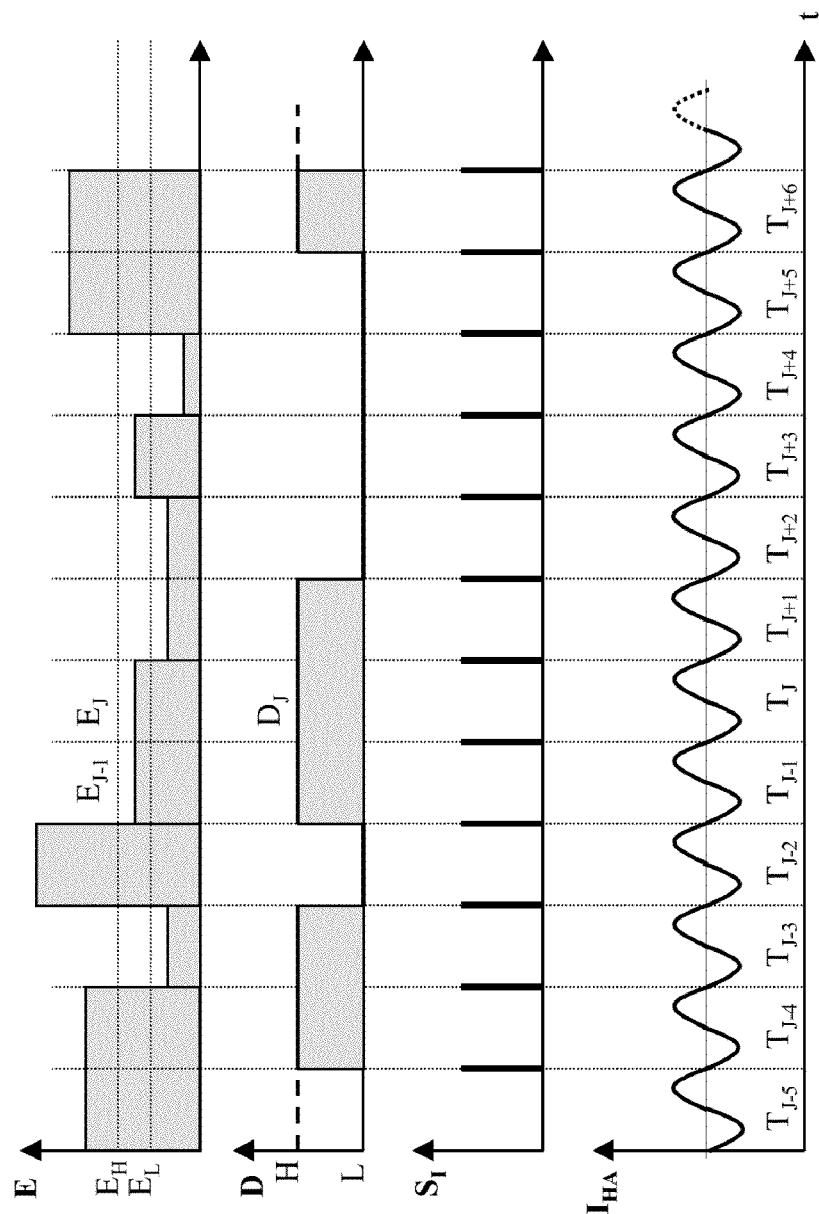

Examples of the timing regulating the operation of the comparison block CMP are represented in FIGS. 7 and 8 and they refer to the case in which the synchronism signals are respectively associated to the zero-crossings of the mains voltage, indicated with Vac, or of the current absorbed by the appliance HA1, indicated with $I_{HA}$, respectively corresponding to which are the synchronism signals $S_V$ and $S_I$. The selection of the type of synchronism signal to be associated to the comparison block CMP is performed by the microcontroller AMC and is dynamically defined by the latter by means of the bidirectional communication SL.

FIGS. 7 and 8 show that the updating of the logic level of the signal D, performed at the beginning of the generic mains period $T_J$, is based on the result of the comparison performed by the digital comparator CMP at the end of the mains period $T_{J-1}$, i.e. at the end of the immediately preceding mains period, according to the following logic:

if $E_{J-1} > E_H$ then $D_J = H$
if $E_{J-1} < E_L$ then "$D_J = L$
if $E_L \leq E_{J-1} \leq E_H$ then $D_J = D_{J-1}$ where:

$E_{J-1}$ is the quantity representative of the energy consumed by the electric appliance HA1 during the mains period $T_{J-1}$.

$E_H$ is a greater reference value, to be compared with the value of the quantity $E_{J-1}$;

$E_L$ is a lower reference value, to be compared with the value of the quantity $E_{J-1}$;

$D_J$ is the binary value acquired by the digital variable D in relation to the result of the comparison of the value of the quantity $E_{J-1}$, associated to the mains period $T_{J-1}$, with the reference values $E_H$ and $E_L$; and H and L are two opposite binary logic levels, for example H=1 and L=0.

Upon observing the same FIGS. 7 and 8 it is clear that the reference values $E_H$ and $E_L$ are used for creating a hysteresis with respect to the measured value E, in such a manner to avoid situations of instability of the signal D caused by the possible presence of electrical interferences overlapped to said measured value E.

In addition, in a possible simplified implementation, the values of $E_H$ and $E_L$ may be assumed as being coinciding, or replaced by a single reference value. In such is a case, the measured value E shall be compared with a single reference value $E_R$ and the logic of the comparison shall be the following:

if $E_{J-1} > E_R$ then $D_J = H$
if $E_{J-1} < E_R$ then $D_J = L$
if $E_{J-1} = E_R$ then $D_J = D_{J-1}$.

In this simplified implementation, the two registers EH and EL of FIG. 6 can be possibly replaced by a single register, in cases where a single reference value $E_R$ is used.

In the case represented in FIGS. 7 and 8, the synchronism signals $S_V$ and $S_I$ are generated at the zero-crossing of the descent fronts of the alternating signals Vac and $I_{HA}$ respectively. In another possible case, alternative with respect to the previous one, the abovementioned synchronism signals are generated at the zero-crossing of the ascent fronts of Vac and $I_{HA}$.

The selection of the type of synchronism signal to be used, between $S_V$ and $S_I$, and of the type of front of the respective signal Vac and $I_{HA}$ that generates it, is—as already mentioned—performed by the microcontroller AMC through a suitable configuration of the synchronism block SYNC, attained by means of the serial line SL. In this case, a first criteria according to which the microcontroller AMC selects the synchronism $S_V$ or $S_I$, according to the invention, may be the following:

if the phase displacement between the mains voltage Vac and the current $I_{HA}$ absorbed by the load HA1 is negligible, the impedance of HA1 prevalently being of the resistive type, then it is preferable to use the synchronism signal $S_V$;

on the contrary, if the abovementioned phase displacement shows the presence of a prevalently reactive load HA1, then it would be preferable to use the synchronism signal $S_I$, on condition that the value of the current $I_{HA}$ be sufficiently high, as explained hereinafter.

The phase displacement between the voltage Vac, applied to the electric appliance HA1, and to the current $I_{HA}$ absorbed by the latter, is calculated by the integrated circuit CSA and acquired by the microcontroller AMC through the communication line SL. In a different embodiment of the invention, said phase displacement is obtained by the same microcontroller AMC by means of suitable processings of the voltage and currents measures acquired by CSA through the communication line SL.

It should be observed that, while the synchronism voltage signal $S_V$ is always easily generatable, being the value of the mains voltage Vac substantially stable, the synchronism signal $S_I$ may be difficult to generate when the value of the current $I_{HA}$ absorbed by the electric appliance HA1 is very low (for example lower than 10 mA), given that in such case it can be difficult to detect the zero-crossing thereof. In a situation of this type, it is therefore preferable to adopt the voltage synchronism $S_V$. This leads to the following more efficient second criterion according to which, also taking into account the previous first criterion, the microcontroller AMC selects, in a preferred embodiment, one or the other synchronism signal:

if the electric appliance HA1 transmits its digital information varying the current absorption $I_{HA}$ in such a manner that the lower level (corresponding for example to the zero logic) corresponds to a very low absorption (for example the stand-by value of HA1), then the voltage synchronism $S_V$ is adopted;

on the contrary, if the electric appliance HA1 transmits its digital information varying the current absorption in such a manner that the lower level has a significant value (for example a few tens of mA or more), then the current synchronism $S_I$ is adopted when the impedance of HA1 is of the reactive type.

Therefore, in summary, the selection of the synchronism signal $S_V$ or $S_I$, to be associated to the updating of the logic state of the digital signal D may occur under the following conditions:

the synchronism signal acquired by default after each initialization step of the device CSA is the signal $S_V$;

the synchronism signal $S_V$ may be replaced by the synchronism signal $S_I$ when the impedances of HA1 is of the reactive type;

the decision of replacing $S_V$ with $S_I$ is taken by the microcontroller AMC which interacts with the circuit CSA through the communication line SL.

The term "initialization step" of the circuit CSA is meant to designate the is step subsequent to each condition of resetting or starting the operation of the circuit itself, such event being caused by a power-on event of the power supply circuit (PS of FIG. 2, not represented for the sake of simplification in FIG. 6), i.e. of the per se known device which, obtaining energy from the alternating electric network Vac, generates the direct low voltage (typically equivalent to 5 Volts or 3.3 Volt) required to supply the communication device HG according to the invention, or by a sudden drop of the power supply, or by any other cause. During each initialization step, the control registers of the solid state circuit CSA (for example EH and EL) acquire determined default values, which can subsequently be modified at any time upon command of an external programmable device capable of communicating with the circuit CSA, which is the microcontroller AMC, programmed to this purpose.

As mentioned, the embodiment of the invention illustrated in FIG. 6 allows obtaining an extreme simplification of the procedure for decoding the binary information with respect to the one possible according to the prior art of FIG. 1. Such decoding, in fact, is performed through hardware-type means, obtainable by means of standard logic circuits, by the same measuring integrated circuit CSA, instead of software-type means by a microcontroller which dialogues with an integrated circuit serving as an electrical quantities measuring device: this implies that the use of a microcontroller with high performances—and thus expensive—is not required, but it is sufficient to use an extremely economical microcontroller, or exploit the residue resources of a microcontroller designed to perform other functions (for example the microcontroller which controls the communication protocol of a determined network, such as the microcontroller AMC). This allows substantial saving derived from the elimination of the microcontroller M1 (FIG. 1), provided for by the state of the art described by WO 02/21664, the function of said microcontroller being totally performable by the microcontroller AMC which controls the communication protocols regarding ZB and GGM.

Figure 9:
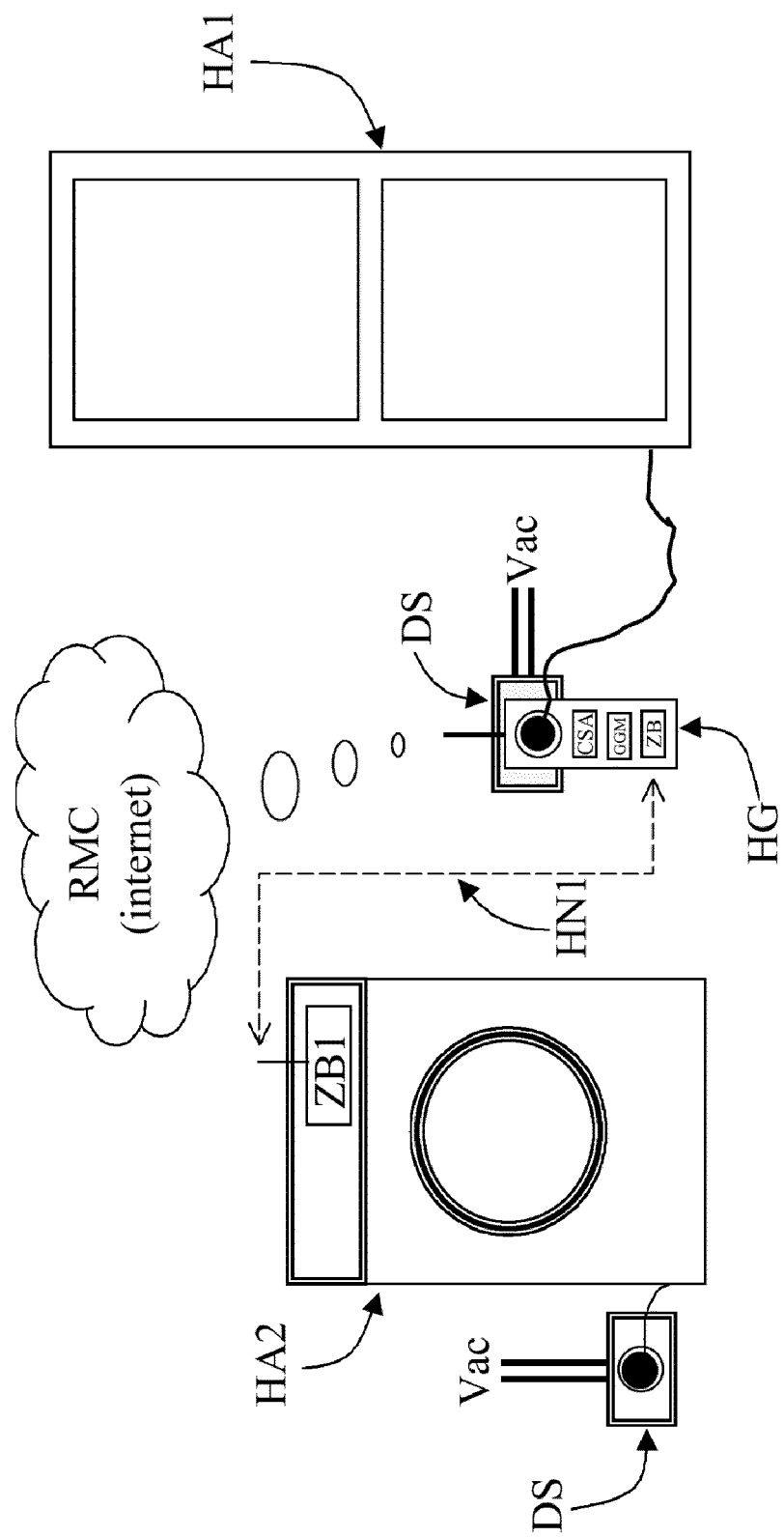
FIG. 9 illustrates a first embodiment of the communication device of FIG. 2 or 7 in a monitoring system according to the invention.

FIG. 9 shows a first example of use of the invention wherein to the device HG, being coupled to any standard power socket DS, the household appliance HA1 is connected in a direct manner and the household appliance indicated with HA2 is connected in an indirect matter, the latter having a control system capable of generating information and transmitting it on the local network HN1 through a respective communication node ZB1. "Direct connection" is meant to designate the connection of the cable or another wired supply line of an electric appliance to a power socket of the device HG, while "indirect connection" is meant to designate the connection between the communication node ZB of the device HG to an homologous communication node of another electric appliance, of the same local network, represented herein by network HN1. It should be observed that, instead of a household appliance, element HA2 may be represented by any other electrical appliance or device, including sensor devices (such as for example temperature, humidity, gas leakage, fire, water leakage sensors and so on and so forth), which can be provided with a communication node of the local network HN1.

In case of the direct connection of FIG. 9, the electric appliance HA1 sends to the device HG digital information D, said digital information D being acquired by the device HG through the device CSA according to the general teachings described in WO 02/21664, or according to the new improved technique described above with reference to FIGS. 6-8. In the case of the appliance HA2 connected indirectly, the contents of the digital information generated by the control system of the same appliance are exchanged through the local network HN1, with HG providing for the related transmission to the remote service centre RMC, without requiring any intervention, by a user, on direct interaction means (such a s a keyboard and/or display), as in the case of WO 99/43068.

In the case of the appliance HA1 connected directly, the connection is of the point-to-point type and can be unidirectional, in the direction that goes from the electric appliance HA1 to the device HG, or bidirectional (see the general teachings of WO 02/21664, regarding the possibility of communication in the direction that goes from the device HG to the electric appliance HA1); in the preferred embodiment of the invention—for simplicity and costs reasons—the abovementioned communication is of the unidirectional type. In the case of indirect connection (appliance HA2), the communication occurs, as mentioned, through the local network HN1 and it is preferably of the bidirectional type.

In the case where an electric appliance is directly connected to the device HG, the following three cases, according to the invention, should be distinguished:
  a) the electric appliance is provided with means for dialoguing with the device HG in a point-to-point mode, through its power supply cable, as described above;
  b) the electric appliance is provided with means for dialoguing with the device HG through a local network HN1; and
  c) the electric appliance is not provided with any communication means for dialoguing with the device HG.

In case a), described in FIG. 9, the electric appliance HA1 is capable of sending to the device HG, day after day, its statistical and diagnostic data with the aim of allowing offering a remote assistance and preventive maintenance service through the remote service centre RMC. For this purpose, the information generated by the control system of HA1 is decoded by the circuit CSA in the ways described above and then transmitted, under control of the microcontroller AMC, to the remote centre RMC, by means of the modem GGM. Further data, complementary to that generated by the control system of the electric appliance HA1 and regarding the detail of the electric energy consumptions associated to the operation within the time of the electric appliance HA1, can be generated according to the invention by the same device HG, through the circuit CSA, which data can be sent to the same remote service centre RMC together with the abovementioned statistical and diagnostic data provided by the same electric appliance HA1. It should also be observed that the information and data of this type can be possibly used for statistical and/or diagnostic purposes.

In case b), represented in FIG. 9 by the electric appliance HA2, the statistical and diagnostic information generated by the control system of the same appliance are sent to the device HG through the local network HN1, preferably based on radio frequency like in the illustrated case, or alternatively based on a power line communication system. In case of a radio frequency network, preferably used is the ZigBee technology (IEEE-802.15.4 standard). Therefore, referring to FIG. 9, the device HG is prearranged to receive from HA2 statistical and diagnostic data through the local network HN1 by means of nodes ZB and ZB1, while, in case of HA1, alongside statistical and diagnostic data sent by the electric appliance and received by the device HG, the latter also acquires the electric energy consumption data generated by the measuring device CSA present, according to the invention, inside the same.

In case c), assuming that the power socket SK of the device HG is connected to an electric appliance not provided with any means for communicating with the external environment (i.e. it is not provided with a communication node connected to the local network HN1 and it is not prearranged for communicating according to the general teachings of WO 02/21664), the same device HG is capable of periodically acquiring and sending to a remote service centre RMC information regarding the trend of the electric energy consumptions associated to said electric appliance over time.

Figure 10:
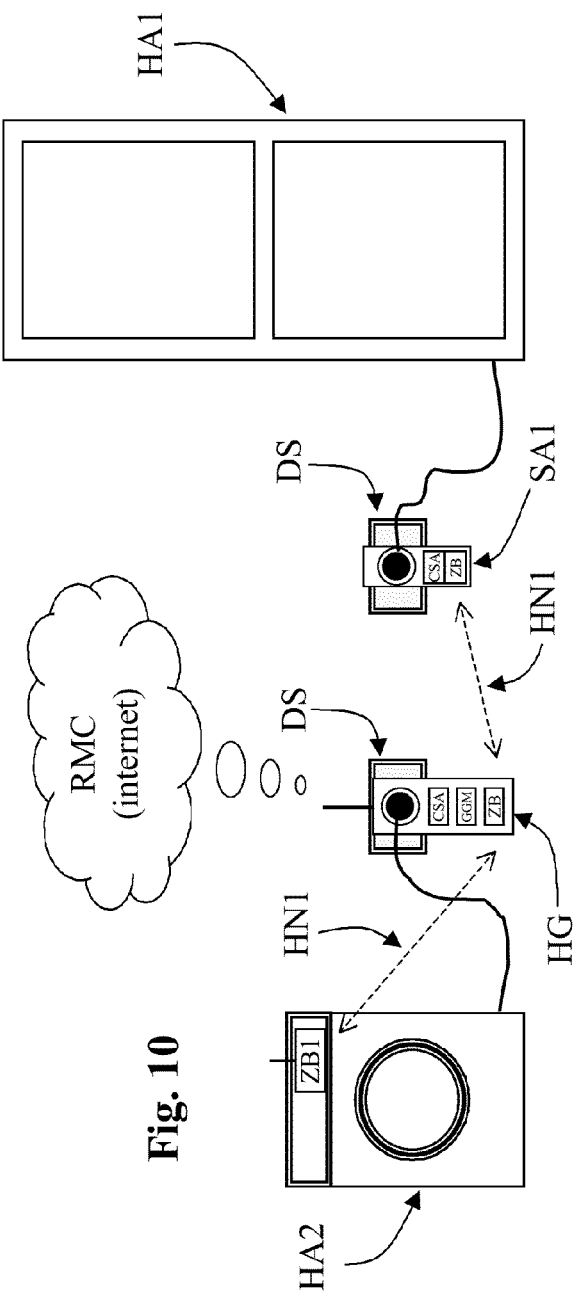
FIG. 10 illustrates a second embodiment of the communication device of FIG. 2 or 7 in a monitoring system according to the invention.

FIG. 10 shows a second example of use of the invention, wherein now connected—respectively directly and indirectly—to the device HG, inserted into any standard power socket DS, is the household appliance HA2 and the household appliance HA1. In such case, referring to the electric appliance HA2, the device HG receives from said appliance statistical and diagnostic data through the local network HN1 and therein generates, through the circuit CSA, the electric energy consumption data of said appliance HA2. Referring to the electric appliance HA1, the device HG receives statistical data, diagnostic data and energy consumption data regarding HA1 through the local network HN1, connected to which is a device SA1 which, in this implementation of the system according to the invention, supplies the same electric appliance HA1, dialogues with the same and measures the energy consumed by the latter. Thus, in this case, the device SA1 serves as a proxy between the electric appliance HA1, which communicates according to the general teachings of WO 02/21664, and the device HG with which it exchanges information through the local network HN1. Clearly, also in this case, HG provides for sending the information regarding HA1 and HA2 to the remote service centre.

Figure 11:
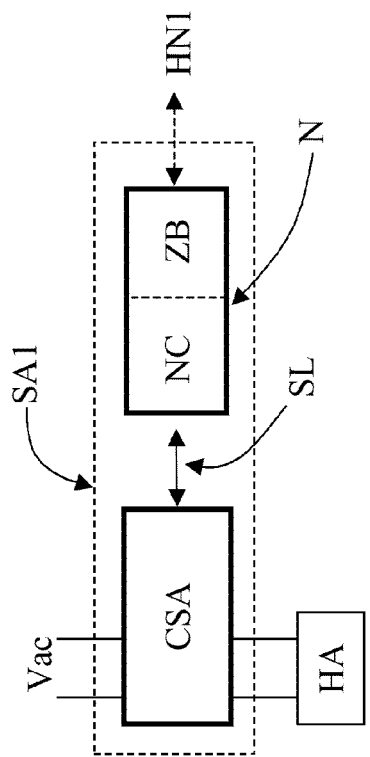
FIG. 11 is a block diagram of a monitoring device improved with respect to the prior art represented in FIG. 1, for the possible use in the system of FIG. 10.

Represented in FIG. 11 is a particularly advantageous embodiment of device SA1, which is essentially made up of a monitoring device of conception similar to that illustrated in FIG. 1 and described in WO 02/21664, but which is also advantageously obtained in a compact version. In this device SA1, the functions of
  measuring the value of a quantity representative of the electric energy consumed within each mains period,
  comparing such value with a suitable reference value, and
  generating a binary information depending on the result of such comparison are performed by a circuit CSA analogous to the one present in the device HG (see FIG. 2 or 6). As deducible, also regarding the device SA1, the use of the circuit CSA embodied according to FIGS. 6-8 allows obtaining important advantages, both regarding the simplification of the procedure for decoding information sent by the electric appliance, and regarding the possibility of directly interfacing the measuring circuit CSA with the same microcontroller NC of the node N, which controls the communication protocol towards the local network HN1 (and thus without requiring the microprocessor M1 of FIG. 1): this due to the fact that the hardware integration inside the measuring device CSA of the function of decoding the information sent by the electric appliance—which, according to the means known from WO 02/21664, can only be performed through complex software algorithms—drastically simplifies the work of the microcontroller with which such measuring device is in relation.

Figure 12:
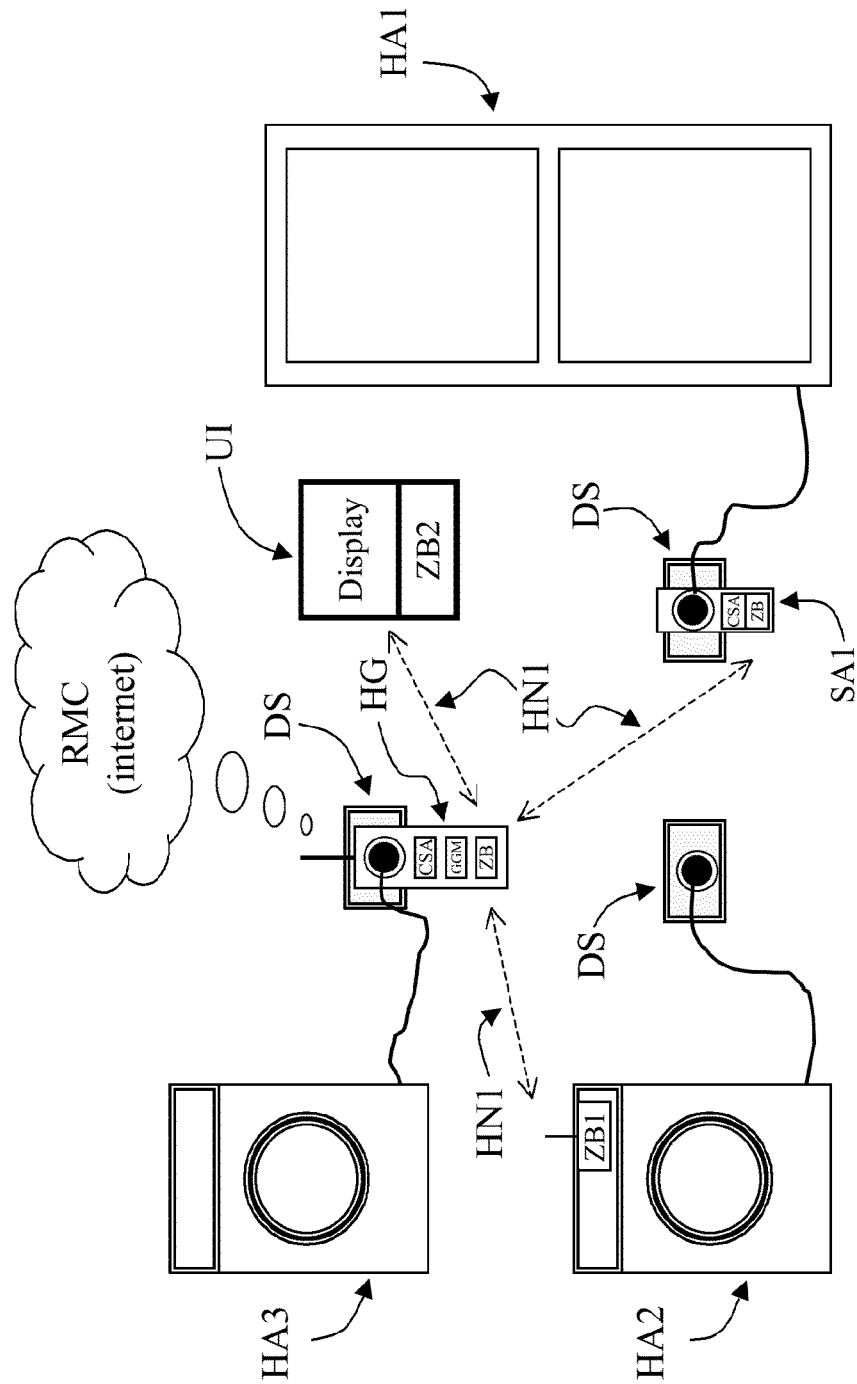
FIG. 12 illustrates a third embodiment of the communication device of FIG. 2 or 7 in a monitoring system according to the invention, further provided in which is also the use of a monitoring device cording to FIG. 11.

FIG. 12 shows a third example of use of the invention, wherein connected—respectively directly and indirectly—to the device HG, inserted into any standard power socket DS, are the household appliance indicated with HA3 and the household appliances HA1 and HA2, respectively being
  HA3 an electric appliance without means for communicating with the external environment,
  HA1 an electric appliance capable of communicating through its power supply cable, as previously described, through a device SA1, and
  HA2 an electric appliance provided with connection to the local network HN1.

Furthermore, in this implementation of the monitoring system according to the invention, the device HG is configured for dialoguing through the local network HN1 with a device UI connected to the same local network, UI being for example a user interface device, prearranged for showing on the display thereof the information is acquired from HG. In such a case, the device HG is thus capable of performing the following operations:
  acquiring data regarding electric energy consumptions of the appliance HA3 (generated by HG through the measuring circuit CSA);

acquiring statistical and diagnostic data, sent by HA1 through its power supply cable to the device SA1 and transferred by the latter to HG through the local network HN1, alongside data regarding the electric energy consumptions of said appliance HA, generated by SA1 through its own measuring circuit CSA;

acquiring the statistical and diagnostic data sent by HA2 through the local network HN1;

sending to the display device UI, through the local network HN1, one or more information already acquired from the electrical appliances HA3, HA1 and HA2;

sending to the remote service centre RMC information or data regarding HA1, HA2 and HA3.

Excluding the case of HA3, wherein the electric appliance does not have its own communication means, in the other two cases of HA1 and HA2 the electric appliance operates, according to the present invention, according to the following criteria:

i) electrical appliances of type HA1 (communication according to the general teachings of WO 02/21664 and/or the improved art described referring to FIGS. 6-8) preferably use a communication of the unidirectional type, which obviously goes from the electric appliance towards the device HG, acquire the "role of master" towards the device HG, and send their information in "event-driven" mode;

ii) the electrical appliances of type HA2 (communication through local network HN1) typically use a bidirectional communication, prevalently acquire the "master role" with "event-driven" communication towards the device HG, but they can also meet the requests of data or commands by the latter; furthermore, they can perform downloading—through the mediation of the device HG—software updates regarding the digital control system of the same electric appliance.

Acquiring the "role of master" with respect to the receiving device HG is means autonomously deciding, with respect to said device, when to start a transmission and the type of contents to be sent. "events-driven" communicating means starting a communication towards the device HG when a given event occurs, and consequently sending the information associated to said event.

Following are possible events, referred—according to the invention—to household appliances and hence strictly provided for exemplifying and non-limiting purposes:

start of cycle event: occurs when the user—after having selected an operation cycle or programme (washing programme, cooking programme, drying programme, . . . ) and after having defined the respective options (washing water temperature, amount of fabrics, level of dirt, spin speed, residual humidity in garments, duration of the cycle, cooking temperature, . . . )—presses the start or programme start button. In such case, the information sent regards the type of cycle or programme selected and the possible options selected;

end of cycle event: occurs when the operation cycle or programme of the household appliance ends. In such case, the information sent is the information generated during the cycle and depends on the type of household appliance and on its distinctive characteristics, for example on the type of sensors it is provided with. Following are examples of end of cycle information: amount of water consumed, type of detergent used by the user, amount of detergent introduced, amount of garments detected by the machine weight sensor, number of rinsing operations performed, actual duration of the cycle, and so on and so forth;

diagnostic event: occurs when the self-diagnosis programme of the digital control system of the household appliance detects a failure or a failure signal (incipient failure). In such case, the information sent is diagnostic information regarding the type and entity of the failure;

timed event: occurs at suitably defined periodical intervals (for example every day, every week, . . . ) and typically regards electrical appliances that are always active, such as for example refrigerators. In such case, at each timed event, the control system of the household appliance sends the data accumulated from the last time transmission had been performed. The sent data is mainly of statistical type (average temperature in the fridge compartment, average temperature in the freezer compartment, temperature value set by the user, average number of times the door is opened during the various day and night periods of time, average times of activation and pause of the compressor, and so on and so forth) and they are prevalently used to support preventive maintenance services.

As explained beforehand, the microcontroller AMC has the main role of allowing the device HG to acquire data associated to the appliance directly connected to the power socket SK, to control the acquisition of data coming from any other appliances or sensors connected to the local network HN1 and to convey all this data towards the remote site RMC, through the modem GGM. Furthermore, in the preferred embodiment of the invention, the monitoring device HG also serves as a supervisor node of the local network HN1, i.e. to manage the procedure of connecting/disconnecting or installing/uninstalling—with respect the local network HN1—the nodes associated to said local network, according to a Plug-&-Play procedure, i.e. according to standard automatic installation/uninstallation protocols such as UPnP (Universal Plug-and-Play) proposed by Microsoft Corporation or the like. Therefore, said monitoring device HG provides for automatic identification and installation of a new appliance during the connection to the local network HN1 thereof, without requiring any operation from the user. Thus, for such purpose, the microcontroller AMC—which, alongside the transceiver ZB, provides the network node contained in the device HG—is configured to perform the role of supervisor and manager/controller of the local network HN1.

In order to perform such supervision/control role, the node AMC-ZB of the device HG is located at a higher hierarchy level with respect to all the other nodes ZBn connected to the local network HN1 (electrical appliances and/or devices for interacting with the user and/or sensors) and is configured for performing identification and automatic installation of possible other nodes that might be present subsequently over time (purchase of new compatible products or devices by the user). Such a Plug-&-Play procedure, of per se known type, requires the insertion of the address of the new nodes into an address database containing the other nodes of the local network HN1, and for such purpose the microcontroller AMC is provided with suitable readable/writable non-volatile memory means, in which such database is encoded.

Figure 13:
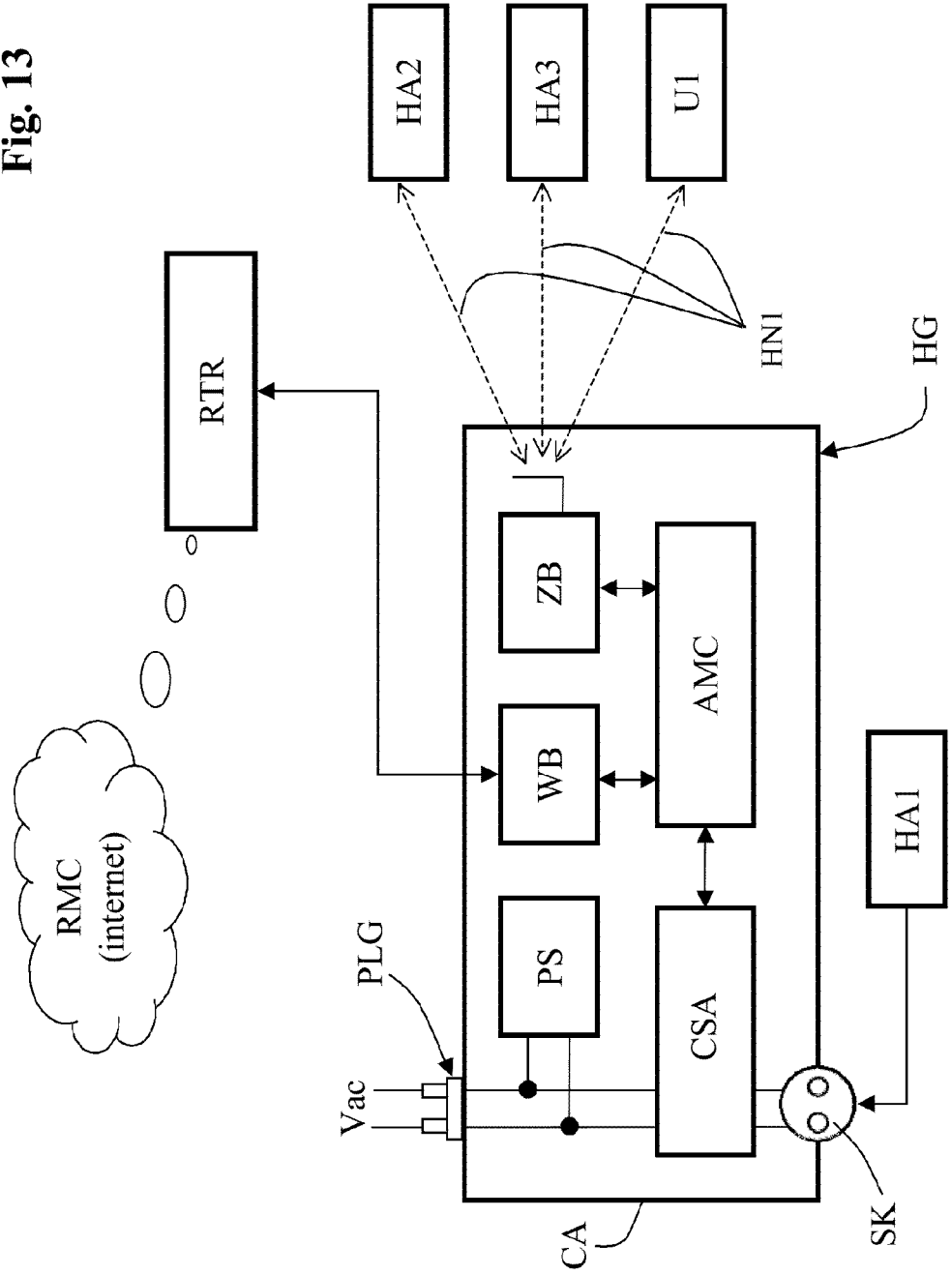
FIG. 13 is a block diagram of a first variant embodiment of the communication device of FIG. 2.

In a further possible embodiment of the invention the information acquired by the device HG is transmitted to the remote service centre RMC exploiting the presence—in the same environment in which the device HG is installed—of an xDSL router or the like, capable of interfacing with the Internet network in the "always on" mode, i.e. guaranteeing a constant connection through said Internet network. A solution of this type is schematically illustrated in FIG. 13, according to which the modem GGM is replaced by a known device WB for broadband access to the abovementioned xDSL router or the like, represented by block RTR, also of the per se known type. The broadband access device WB may be connected to the router RTR by means of an Ethernet cable, or by means of a USB cable, or by means of a wireless connection, for example based on the WiFi protocol (IEEE-802.11b and/or its variants).

It is clear that the present invention may be subjected to many variants without departing from the scope of protection as defined by the attached claims.

According to the embodiments of FIGS. 6 and 11, the measuring circuit CSA is an ASIC circuit (Application-Specific Integrated Circuit), or an integrated circuit dedicated to the particular use described, which is that of allowing the communication of data and information by an electric appliance, prearranged for that purpose, through its own electrical power supply cable. The use of such ASIC circuit is particularly advantageous, not only for the aforementioned reasons, but also in terms of reducing the cost of the specific component and the overall dimensions of device HG and/or of device SA1 described.

Figure 14:
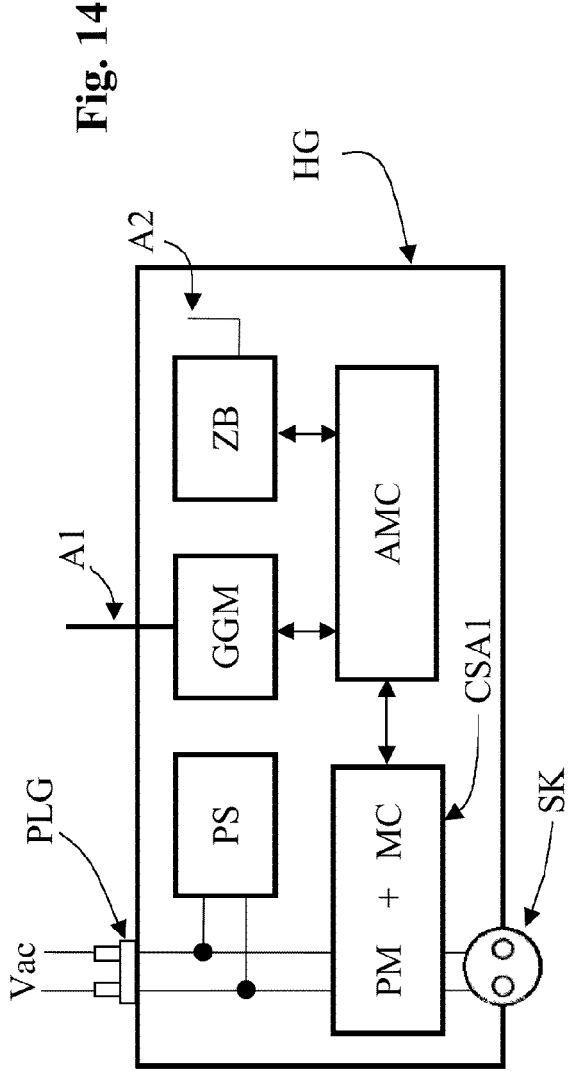
FIG. 14 is a block diagram of a second variant embodiment of the communication device of FIG. 2.
Figure 15:
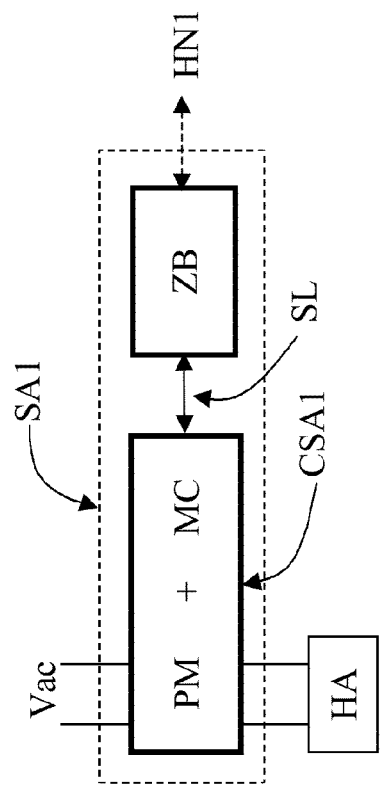
FIG. 15 is a block diagram of a of a variant embodiment of the monitoring device of FIG. 11.

Additionally, in possible alternative embodiments, exemplified in FIGS. 14 and 15 with reference to devices HG and SA1, respectively, the custom circuit CSA may be replaced by a single-chip programmable device CSA1 of commercial type, provided with a power meter PM and a microcontroller MC, or a device that implements—in compact form—the two devices PM and M1 present in the solution disclosed by WO 02/21664 and exemplified in FIG. 1.

Non-limiting examples of commercial programmable devices of the single-chip type, that can be used to implement the device CSA1, are the device AS-8218/28 by Austriamicrosystems, or the device ADE7169F16 by Analog Devices, or also the device CS7401XX of Cirrus Logic, which can be easily programmed to perform the function of measuring the value of a quantity representative of the electric energy consumed within each mains period, that of comparing such value with a suitable reference value and that of generating a binary information depending on the result of such comparison.

It is observable from FIG. 15 that, in case a single-chip device CSA1 is used for the implementation of SA1, the microcontroller MC of said device CAS1 may be conveniently configured to manage the communication protocol related to the network HN1.

In a further possible advantageous version of the invention, not represented, the microcontroller AMC and the transceiver ZB are incorporated in a single device. Also for such implementation it is pointed out that are currently available programmable single-chips of this type, made up of a transceiver and a microcontroller which controls the communication protocol thereof including the application level (seventh level of a protocol in compliance with the OSI standard), i.e. the specific function that acquires, processes and organises the data to be communicated to the remote service centre.

The invention claimed is:

1. A communication device configured for connection of one or more household electrical appliances to a remote service center offering remote assistance and preventive maintenance services for said one or more household electrical appliances, the communication device comprising:
   at least one control unit,
   first electric connection means for connection of the communication device to an alternating voltage electric mains network having a mains alternating voltage,
   second electric connection means for providing the mains alternating voltage to a power supply line or cable belonging to a first electric appliance of the one or more household electric appliances,
   first communication means operatively connected to the at least one control unit and prearranged for receiving information generated by said first electric appliance and transmitted over said power supply line, the first communication means comprising:
      measuring means connected between the first electric connection means and the second electric connection means and prearranged for measuring at least one quantity representative of electric energy absorbed from said alternating voltage electric mains network during a generic mains period by said first electric appliance,
      comparison means for comparing the value of said at least one quantity with at least one reference value,
      generator means for generating a digital signal having a logic state during a considered period of the mains alternating voltage that is a function of a result of the comparison performed by the comparison means between the value of the at least one quantity measured during a preceding generic mains period of the mains alternating voltage with said at least one reference value,
   second communication means operatively connected to the control unit and prearranged for establishing a connection with a local area network,
   third communication means operatively connected to the control unit and prearranged for establishing a connection with a further communication network that is different from said local area network and adapted for communication with the remote service center,
   the control unit being prearranged for
   acquiring, by means of the first communication means, first information generated by said first electric appliance and transmitted by means of said power supply line or cable and/or second information regarding electric energy consumptions associated with operation of said first electric appliance,
   acquiring, by means of the second communication means, third information available on said local area network, and
   transmitting to said remote center, by means of the third communication means, at least one of the first information, the second information, and the third information.

2. The device according to claim 1, wherein the control unit is prearranged for performing a role of supervisor and controller of said local area network, particularly for automatic identification of a presence of one or more additional household electrical appliances connected to said local area network.

3. The device according to claim 1, wherein the measuring means, the comparison means and the generator means are implemented through hardware means in an ASIC-type integrated circuit.

4. The device according to claim 1 wherein the measuring means is adapted to generate said second information regarding electric energy consumptions associated with the operation of said first electric appliance.

5. The device according to claim 1, wherein the second communication means comprises at least one of a radio frequency transceiver, a power line communication transceiver, and a cable transceiver.

6. The device according to claim 1, wherein the third communication means comprises one of a radio frequency telephonic modem and a broadband access device prearranged for a connection to a router device for Internet access.

7. The device according to claim 1, wherein the control unit comprises a programmable microcontroller.

8. The device according to claim 7, wherein the programmable microcontroller is integrated into a programmable device of a single-chip type, in which the second communication means is also implemented.

9. The device according to claim 1, wherein the first communication means is integrated into a programmable device of a single-chip type, in which a power meter and a programmable microcontroller are implemented.

10. The device according to claim 1, further comprising:
at least one reference value is utilized as a single value and said generator means is configured to assign the logic state to the digital signal according to the following logic:
if $E_{J-1} > E_R$ then $D_J = H$
if $E_{J-1} < E_R$ then $D_J = L$
if $E_{J-1} = E_R$ then $D_J = D_{J-1}$
where H and L are two opposite binary logic levels, $E_R$ is the single reference value, $E_{J-1}$ is a measured value associated with the preceding period, $D_J$ is the logic state, and $D_{J-1}$ is the logic state associated with the preceding period,
or
the at least one reference value is a pair of reference values and said generator means is configured to assign the logic state to the digital signal according to the following logic:
if $E_{J-1} > E_H$ then $D_J = H$
if $E_{J-1} < E_L$ then $D_J = L$
if $E_L \leq E_{J-1} \leq E_H$ then $D_J = D_{J-1}$
where H and L are two opposite binary logic levels, $E_H$ is a greater reference value, and $E_L$ is a lower reference value, $E_{J-1}$ is the measured value associated with the preceding period, $D_J$ is the logic state, and $D_{J-1}$ is the logic state associated with the preceding period.

11. The device according to claim 1, further comprising a memory means for retaining at least one of:
the measured value associated with the preceding period;
the at least one reference value; and
an address database of communication nodes of the local area network.

12. The device according to claim 1, wherein the generator means is configured to associate to an updating of the logic state of the digital signal a synchronism signal generated at each zero-crossing of only descent fronts or only of ascent fronts of the mains alternating voltage and an alternating current absorbed by said electric appliance.

13. The device according to claim 12, further comprising a synchronism means, prearranged for generating said synchronism signal.

14. The device according to claim 11, wherein the first communication means is prearranged for receiving from said control unit, through a communication line, signals for modifying a related present operation mode, the signals indicating the at least one reference value and/or signals indicating the type of synchronism signal to be used.

15. The device according to claim 12, wherein the first communication means is configured to transmit to said control unit sequences of binary values associated with the generated digital signal, along with the related synchronism signal.

16. The device according to claim 11, wherein after each initialization step:
the at least one reference value acquires a predetermined value by default, and/or
the synchronism signal acquired by default is a synchronism signal generated at each zero-crossing of only descent fronts or of only ascent fronts of the mains alternating voltage.

17. The device according to claim 1, wherein the measuring means is prearranged to measure at least one of:
a maximum value, an average value, an affective value, and other value, all deriving from suitable processing of a significant set of precise values of a current or electrical power absorbed during a mains period, and
a value of the energy consumed within the mains period.

18. An integrated circuit for measuring electrical quantities, of a type designed to be connected in series between a power supply line of an electric appliance and a power supply socket associated to an alternating voltage electric mains network, the integrated circuit comprising measuring means for measuring at least one quantity representative of electric energy absorbed from said alternating voltage electric mains network, having a mains alternating voltage, during a generic mains period by said electric appliance the integrated circuit further including:
hardware comparison means for comparing a value of said quantity with at least one reference value,
hardware generator means for generating a digital signal whose logic state during a considered period of the mains alternating voltage is a function of a result of the comparison performed by the comparison means between the value of the quantity measured during a preceding period with said at least one reference value.

19. The integrated circuit according to claim 18, wherein the at least one reference value is a single value and said generator means is configured to assign the logic state to the digital signal according to the following logic:
if $E_{J-1} > E_R$ then $D_J = H$
if $E_{J-1} < E_R$ then $D_J = L$
if $E_{J-1} = E_R$ then $D_J = D_{J-1}$
where H and L are two opposite binary logic levels, $E_R$ is the single reference value, $E_{J-1}$ is a measured value associated with the preceding period, $D_J$ is the logic state, and $D_{J-1}$ is the logic state associated with the preceding period.

20. The integrated circuit according to claim 18, wherein the at least one reference value is a pair of reference values and said generator means are is configured to assign the logic state to the digital signal according to the following logic:
if $E_{J-1} > E_H$ then $D_J = H$
if $E_{J-1} < E_L$ then $D_J = L$
if $E_L \leq E_{J-1} \leq E_H$ then $D_J = D_{J-1}$
where H and L are two opposite binary logic levels, $E_H$ is a greater reference value, $E_L$ is a lower reference value, $E_{J-1}$ is a measured value associated with the preceding period, $D_J$ is the logic state, and $D_{J-1}$ is the logic state associated with the preceding period.

21. The integrated circuit according to claim 18, further comprising a memory means for retaining at least one of:
a measured value associated with the preceding period; and
the at least one reference value.

22. The integrated circuit according to claim 18, wherein the generator means is configured to associate to an updating of the logic state of the digital signal a synchronism signal generated at each zero-crossing of only descent fronts or of only ascent fronts of at least one of the mains alternating voltage and an alternating current absorbed by said electric appliance.

23. The integrated circuit according to claim 22, further comprising hardware synchronism means prearranged for generating said synchronism signal.

24. The integrated circuit according to claim 21, further comprising a microcontroller that is in signal communication with the integrated circuit the integrated circuit being prearranged for receiving, through a communication line, signals for modifying a respective present operation mode, the signals indicating the at least one reference value and/or a type of synchronism signal to be used.

25. The integrated circuit according to claim 22, further comprising communicating means to transmit sequences of binary values associated with the generated digital signal, along with the related synchronism signal.

26. The integrated circuit according to claim 25, further comprising a microcontroller to acquire, with aid of said synchronism signal, the sequences of binary values.

27. The integrated circuit according to claim 26, wherein the microcontroller is configured to control communication towards an external network.

28. The integrated circuit according to claim 21, wherein after each initialization step:
the at least one reference value acquires a predetermined value by default, and/or
a synchronism signal acquired by default generated at each zero-crossing of only descent fronts or of only ascent fronts of the mains alternating voltage.

29. The integrated circuit according to claim 18, wherein the measuring means is prearranged for measuring at least one of:
a maximum value, an average value, an effective value, and other value, all deriving from a suitable processing of a significant set of precise values of an electric current or power absorbed during a mains period, and
a value of energy consumed within the mains period.

30. The integrated circuit according to claim 18, further comprising a microcontroller that is in signal communication with the integrated circuit through at least one of a communication line and a bidirectional communication line.

* * * * *

UNITED STATES PATENT AND TRADEMARK OFFICE
CERTIFICATE OF CORRECTION

PATENT NO. : 8,386,202 B2
APPLICATION NO. : 12/865189
DATED : February 26, 2013
INVENTOR(S) : Valerio Aisa et al.

Page 1 of 2

It is certified that error appears in the above-identified patent and that said Letters Patent is hereby corrected as shown below:

On the Title page, Item (57), line 21, abstract should read:
Of is the electric appliance, acquiring, by means of the second In the Specifications:

In col. 1, line 23 should read:
Represented by the same household is electric system, the In col. 1, line 61 should read:
Tion of a quantity is representative of the electric energy In col. 4, line 30/31 should read:
Control unit and is prearranged for receiving information In col. 5, line 44 should read:
Devices is connected to the abovementioned local network In col. 12, line 37 should read:
Replaced by a single reference value. In such is a case, the In col. 13, line 55 should read:
Designate the is step subsequent to each condition of resetting In col. 16, line 62 should read:
Play thereof the information is acquired from HG. In such a In col. 17, line 37 should read:
Device HG is means autonomously deciding, with respect to Signed and Sealed this
Fourth Day of June, 2013

Teresa Stanek Rea
*Acting Director of the United States Patent and Trademark Office*

In the Claims:

In col. 22, line 44 should read:
And said generator means are is configured to assign the logic In col. 23, line 3 should read:
With the integrated circuit, the integrated circuit being prear-